Patented July 7, 1936

2,046,764

UNITED STATES PATENT OFFICE 2,046,764

ABRASIVE MATERIAL AND PROCESS OF MAKING THE SAME

Raymond C. Benner and Henry N. Baumann, Jr., Niagara Falls, N. Y., assignors to The Carborundum Company, Niagara Falls, N. Y., a corporation of Pennsylvania No Drawing. Application October 23, 1931, Serial No. 570,758

9 Claims. (Cl. 13—36)

Our invention relates to an improvement in artificial abrasive and refractory materials and the method of producing and bonding them. One part of our invention is concerned with the production of a new and improved type of grain comprising crystals of great hardness formed in a magma which has a fusion point materially lower than that of the crystals. An example of such a material is a magma of magnesium aluminum silicates containing crystals of alumina. Our invention relates also to the control of the hardness or grade of bonded abrasives made from such material, and also to the provision of a superior bond for utilization with ordinary abrasives as heretofore known.

Aluminous abrasive and refractory material has long been made by fusing aluminous ores, such as bauxite, with a small percentage of intermixed carbon beneath the poles of an electric arc formed between large carbon electrodes. The product made in this way ordinarily contains from 92 per cent to 96 per cent of alumina with a small percentage of various impurities, such as iron and titanium oxides, silica, etc. This material is ordinarily crushed, screened and bonded to form abrasive articles. F. J. Tone, in his patents Nos. 1,528,638 and 1,528,639, covers the production of abrasive articles, particularly aggregates for non-slip treads, by self-bonding of such material.

We have found, however, that if, instead of depending upon impurities of the type and amount mentioned, a considerably larger percentage of non-aluminous material of a closely controlled composition is produced in the manufacture of the fused mass, an abrasive of different and distinct properties is produced. Further, there is a great advantage in that the ability to control the hardness or grade of a self-bonded article is secured with such grain, inability to control this property having heretofore largely prevented the broad utilization of the Tone invention. We have further discovered that when a magma of the type thus produced surrounding the alumina crystals is made from a mix so selected as to yield no crystalline portion, it can be pulverized and used to bond abrasive particles, such as ordinary fused alumina, with superior results. The magma itself possesses considerable hardness and has a corresponding abrasive value in addition to which it possesses an ability, when heated to its softening point, to wet and adhere exceedingly strongly to abrasive crystals, particularly if these are of a material capable of dissolving in the fused magma.

As an example of the process which we use, a thorough mixture of 70 parts aluminous ore, 10 parts lime and 20 parts silica is placed in an electric furnace. After heating to a temperature sufficient to produce complete liquefaction, the mass is allowed to cool. During this cooling period, alumina ($Al_2O_3$) crystallizes out of the fused magma until a temperature is reached at which the remainder of the melt solidifies either as a crystalline or as a glassy matrix surrounding these crystals and adhering closely to them, so that when the entire mass is cold a heterogeneous material is present that is composed of a matrix containing numerous crystals of abrasive. These crystallized particles within the matrix possess a high degree of chemical purity and form in larger crystals than the fused alumina abrasive which is made from the usual mix. The crystals are, in general, of sufficient size to be readily distinguishable to the naked eye, and permeate the entire pig of material to a much greater extent than is commonly found in ordinary fused alumina abrasives.

In our process, the various ingredients are heated so hot as to form an extremely fluid and apparently homogeneous bath from which the crystals which form during the cooling process can grow readily to considerable size at the expense of the crystal-forming component in solution in the remaining fluid material. In order that this process may progress freely, it is desirable that the fusion point of the crystal-forming component shall be materially higher than that of the mixture of remaining constituents or of the eutectic between such constituents and the crystal forming material, which forms the ultimate matrix in which the crystals are held. The nature of the final product can be controlled to some degree by governing the rate of cooling, slow cooling in the upper temperature ranges tending to increase the size of the crystals formed. Crystal growth is also influenced by certain impurities.

For making our melt, we may use an electric arc furnace, an electric resistance furnace, a high frequency induction furnace, or even a combustion furnace, the choice depending upon convenience and upon the composition of the material and temperature required to melt it.

The detailed procedure in making our abrasive can be varied somewhat to suit particular requirements. For a source of $Al_2O_3$, bauxite or clay may be used; flint, clay or quartz sand for $SiO_2$ content; and unslaked lime or limestone for $CaO$.

Magnesite can be used as a source of MgO when required. Similarly, where other components are desired the cheapest suitable source will be used. We prefer to use such pure raw materials as are economically available, since the difficulty of cleaning the resulting product is thereby lessened; however, in case the ore is heavily contaminated with iron oxide or titania, these impurities may be reduced to metal by the carbon of the arc electrodes (or by carbon added for the purpose) and then made to combine with metallic iron added in the form of borings to scavenge the melt. This iron then sinks to the bottom of the pig and is removed after cooling in the manner common to ordinary fused alumina abrasive manufacture. It should be noted, however, that particularly in mixes containing silica, carbon must be kept as low as possible or the desired oxide constituents will also be reduced and removed. In general, thorough mixing of the constituents of the melt in crushed or ground form facilitates fusion and is found advantageous.

We do not wish to limit our invention to mixes containing CaO, $Al_2O_3$, and $SiO_2$, as there are numerous combinations of oxides that produce desirable abrasives such as:

|   |   | From | To |
|---|---|------|-----|
|   |   | Percent | Percent |
| 1 | MgO | 2 | 45 |
|   | $Al_2O_3$ | 40 | 90 |
|   | $SiO_2$ | 5 | 45 |
| 2 | BaO or CaO | 2 | 30 |
|   | $Al_2O_3$ | 40 | 90 |
|   | $SiO_2$ | 5 | 45 |
| 3 | CaO | 2 | 25 |
|   | MgO | 2 | 25 |
|   | $SiO_2$ | 5 | 45 |
|   | $Al_2O_3$ | 40 | 90 |
| 4 | $Na_2O$ | 1 | 10 |
|   | $Al_2O_3$ | 50 | 97 |
|   | $SiO_2$ | 2 | 50 |
| 5 | $K_2O$ | 1 | 10 |
|   | $Al_2O_3$ | 50 | 97 |
|   | $SiO_2$ | 2 | 50 |

This large variety of mixtures comprising alumina, silica and alkali or alkaline earth oxides all fall within the broad scope of our invention. Our material consists of at least three oxides and takes the form of crystals held in either a glass or a crystalline eutectic. One of these same oxides or two of them united as a compound (as for example a spinel such as $MgO \cdot Al_2O_3$) forms the major crystalline material in our composition. In order that the matrix shall be capable of softening at temperatures within the ordinary kiln range, it is desirable that one of the oxides present be a basic oxide and another an acidic oxide as indicated above. Abrasive compositions may be secured in which the alumina or the silica is replaced by a second alkaline earth oxide but such compositions, in general, do not possess the hardness which is characteristic of mixes containing a high percentage of alumina and are hence not well adapted for the use to which fused alumina abrasives are ordinarily put.

As indicated above, our abrasive compositions are particularly well adapted for forming self-bonded abrasive articles. The quantity of matrix material may be varied over a considerable range without affecting the abrasive properties of the granular abrasive, provided the ratio of acidic to basic material is kept constant while the percentage of these combined materials in relation to the alumina present is varied. In this way we are able, by producing different lots of material containing different percentages of alumina but having the remaining constituents in a constant ratio to one another, to secure grains which may be made into self-bonded abrasive wheels, etc., having different degrees of hardness, or, as it is ordinarily termed, different grades.

In order to utilize this property of the related series of materials, we make up a number of fusions containing, for example, alumina, magnesia and silica in the following proportions:

|   | I | II | III | IV |
|---|---|----|-----|----|
| Alumina | 70 | 80 | 90 | 100 |
| Magnesia | 10 | 10 | 10 | 10 |
| Silica | 20 | 20 | 20 | 20 |

These fusions are then cooled slowly and after crushing and cleaning are stored separately and are thereafter used separately (or suitably admixed to give intermediate grades) in the production of self-bonded articles as explained below.

If, on the other hand, the composition of the matrix material is varied by simultaneously altering the proportions of all three or more materials present, the characteristic of the abrasive grain itself may be varied to make the grain suitable for the different types of abrasive use.

In a product of the type described containing alumina, silica and magnesia for example, the alumina, if present in excess of about 70 per cent, seems to "stand out" and imparts to the material as a whole a scratch hardness of 9 on Mohs' scale. With smaller percentages of alumina, the grain tends to act somewhat softer. The effect of varying the relative proportions of silica and magnesia, the alumina remaining constant, is in general to produce a tougher and more mechanically robust grain as the proportion of silica increases and, conversely, to produce a less tough and more readily fractured material as the proportion of magnesia is increased. A mixture of 7 per cent MgO, 13 per cent $SiO_2$ and 80 per cent $Al_2O_3$, for example, gives a grain which compares in toughness with the fused aluminous abrasives ordinarily used for snagging steel, while with 10 per cent MgO, 10 per cent $SiO_2$ and 80 per cent $Al_2O_3$, a more friable grain is produced suitable for precision grinding. Similar changes accompany variations in the composition of the matrix when other oxides are used in place of the magnesia.

While we have here suggested that the composition of the original fusion be altered in order to vary the percentage of matrix present in the material, it is also possible to obtain similar results without requiring a large number of different grades of material to be kept in stock by utilizing grain having a minimum amount of matrix to give the desired crystalline characteristics to the granular material and bonding this substance with varying amounts of a separately prepared matrix material made in the same way and corresponding in composition to the portion of the grain which comprises the matrix in which the larger crystals are held. Upon heating to the softening point of this material, it takes firm hold of the abrasive particles even though these are themselves relatively free from matrix material. The more of this material there is added to the mixture to produce an abrasive articles, the harder the grade of the said article.

While we have described self-bonded articles made with our material, it is, of course, possible to use the ordinary ceramic and other bonds in the customary manner, merely incorporating our abrasive grain in place of the variety heretofore used.

The following typical examples are given to illustrate the methods of applying our new type of abrasive in various ways.

I.—Abrasive wheels (self-bonded)

The heterogeneous mass of abrasive is crushed, freed from metallic impurities, etc. and screened to the desired grit size or sizes. From one to four per cent of lignone, or other temporary bond, is added to the grain along with sufficient water to form a good molding mix and mixed wet in a finger mixer for 20 to 30 minutes. The mix is then pressed in a steel wheel mold in a hydraulic press at approximately 1500 pounds per square inch pressure. The piece is then removed from the mold and allowed to dry in an oven held at approximately 150° F. The piece is then ready for firing in a kiln. The kiln may be electric or fuel fired. For the abrasive cited below, the temperature is brought up to 850° C. at the rate of 50° C. per hour, held at that temperature for 24 hours to burn out the organic matter and then raised to 1450° C. at the rate of 50° C. per hour and finally held at 1450° C. for twelve hours. The final firing temperature, of course, varies with the composition of the material comprising the heterogeneous abrasive. In the example under discussion, the composition was 10 per cent CaO, 70 per cent $Al_2O_3$, 20 per cent $SiO_2$. The kiln is allowed to cool naturally until the piece is cool enough to handle. The wheel is then finished in the usual manner.

II.—Abrasive wheels (with added bond)

This type of wheel is made similar to the one just described with the following exceptions: Two per cent of dry lignone, along with a bond of the ordinary ceramic type or of the same composition as that of the non-crystalline portion of the aggregates, is added to the grain and mixed dry for 20 minutes. Water is then added as before and mixing continued for an additional 20 minutes. The burning schedule is similar to the above, the maximum temperature varying with the type of bond.

III.—Floor tile aggregates

This material is made by crushing the fused mass, and screening out a particular size, such as 80 mesh, or, if a colored aggregate is desired, by using the fine portion, 40 mesh and finer, and adding powdered oxide colorants, and molding into some convenient shape for firing similar to the process described for making abrasive wheels. The burned pieces are afterwards broken to the desired size or sizes and are ready to use as aggregates to be laid in cement to form a terrazo floor.

IV.—Floor tile

These may be either self-bonded or ceramic-bonded in the manner described for abrasive wheels, or may be made up with cementitious bonds such as Portland or magnesium oxychloride cements or with various organic binders. For self-bonded tile 60 and finer grain is satisfactory, while for bonded pieces a "straight grit" of say 80 mesh is preferably used in amounts from 30 to 85%, together with suitable inert filler material such as grog, sand, etc., depending upon the binder selected. Terrazzo type tile may also be made using 50 per cent to 70 per cent of a mixture of aggregates of the type described above with marble chips in the proportion of 1 part aggregate to from 1½ to 5 parts of marble, the whole being bonded with a slurry of Portland cement and allowed to stand in the mold in a moist atmosphere for 48 hours before being finished off smooth on a lapping wheel.

V.—Refractory articles

Refractory articles can be made by either the method described under self-bonded abrasive wheels or that described for abrasive articles with added bond. Also refractory brick and shapes may be made by casting the fused material into graphite molds of the desired shape and allowing them to cool slowly. For refractory uses, the percentage of glassy matrix must be kept lower than is necessary for abrasives and a relatively refractory matrix composition is desirable.

Other uses for our material in crushed granular form are in the production of coated abrasives such as sandpaper and in use for sandblasting where the extreme angularity of the grain renders the material highly effective. Solid abrasive articles also may be formed by pouring the fused mass into molds to produce such articles as rubbing blocks, brake shoe liners, floor tile, etc.

The process which we have described is capable of many variations with respect to the materials which are treated. The resultant articles as shown above may be put to a wide variety of uses. Our invention is defined by means of the following claims.

We claim:

1. A raw batch for the manufacture of abrasive or refractory material comprising from 38 to 70 parts aluminum oxide, 10 to 30 parts calcium oxide and 5 to 50 parts silicon dioxide.

2. A raw batch for the manufacture of abrasive or refractory material comprising from 45 to 70 parts aluminum oxide, 10 to 45 parts magnesium oxide and 5 to 45 parts silicon dioxide.

3. A raw batch for the manufacture of an electrically fused abrasive or refractory material characterized by predominant spinel crystals in a glassy matrix, said batch consisting of between 38% and 70% alumina, over 15% of an alkaline earth oxide, and at least 10% silica.

4. A raw batch for the manufacture of an electrically fused abrasive or refractory material characterized by predominant spinel crystals in a glassy matrix, said batch consisting of less than 70% and over 38% of alumina, over 15% magnesium oxide, and at least 10% of silica.

5. A raw batch for the manufacture of an electrically fused abrasive or refractory material characterized by predominant spinel crystals in a glassy matrix, said batch consisting of between 38% and 70% alumina, over 15% calcium oxide, and at least 10% of silica.

6. The method of manufacturing abrasive or refractory material which comprises the steps of forming a heterogeneous mass preponderantly of basic aluminate crystals in a matrix of glass by fusing a mixture containing aluminum oxide, over 15% of an alkaline earth oxide and at least 10% of silicon dioxide in which the aluminum oxide comprises not substantially less than 40% of the total mass and not more than 70% of the total mass, and thereafter allowing the mass to cool, whereupon the crystals are formed and are bonded by the residual magma.

7. The method of manufacturing abrasive or refractory material which comprises the steps of forming a heterogeneous mass preponderantly of basic aluminate crystals in a matrix of glass by fusing a mixture containing aluminum oxide, over 15% of an alkaline earth oxide and at least 10% of silicon dioxide in which the aluminum oxide comprises not substantially less than 40% of the total mass and not more than 70% of the total mass, allowing the mass to cool whereupon the crystals are formed and are bonded by the residual magma, and thereafter crushing the mass into granules.

8. The method of manufacturing abrasive or refractory material which comprises forming a heterogeneous mass of calcium aluminate crystals embedded in a matrix of glass from a fused magma containing aluminum oxide, over 15% of calcium oxide and at least 10% of silicon dioxide and wherein the aluminum oxide is not materially less than 40% of the entire mass nor more than 70% of the mass.

9. In the method of manufacturing an abrasive or refractory material, the step of forming a heterogeneous mass of magnesium aluminate crystals and glass from a fused magma containing aluminium oxide, over 15% of magnesium oxide and at least 10% of silicon dioxide, and wherein the aluminum oxide is not substantially less than 38% or more than 70% of the entire mass.

RAYMOND C. BENNER.
HENRY N. BAUMANN, Jr.